(12) United States Patent
Howard

(10) Patent No.: US 6,308,923 B1
(45) Date of Patent: Oct. 30, 2001

(54) SUCTION SUPPORT ASSEMBLY

(76) Inventor: Herman S. Howard, 102-3 Hamilton Ave., Stamford, CT (US) 06905

( * ) Notice: Subject to any disclaimer, the term of this patent is extended or adjusted under 35 U.S.C. 154(b) by 0 days.

(21) Appl. No.: 09/459,055

(22) Filed: Dec. 10, 1999

(51) Int. Cl.[7] .............................. A45D 42/14; F16B 47/00
(52) U.S. Cl. .................................. 248/205.5; 248/205.8; 248/206.2
(58) Field of Search ................ 248/205.5, 205.8, 248/206.1

(56) References Cited

U.S. PATENT DOCUMENTS

| | | | |
|---|---|---|---|
| 355,021 | * | 12/1886 | Lang .................. 248/205.8 |
| 2,233,870 | * | 3/1941 | Muter ................. 248/205.8 |
| 2,965,345 | * | 12/1960 | Gundelfinger et al. ........... 248/205.8 |
| 3,020,017 | * | 2/1962 | Watson ............... 248/205.8 |
| 4,012,007 | | 3/1977 | Cunningham . |
| 4,580,751 | | 4/1986 | Panzer . |
| 4,756,497 | | 7/1988 | Lan . |
| 4,844,395 | * | 7/1989 | Perentin ............. 248/205.8 |
| 5,028,026 | | 7/1991 | Philipps et al. . |
| 5,386,960 | | 2/1995 | O'Brien . |
| 5,423,466 | * | 6/1995 | Moon ................. 248/205.8 |
| 5,511,751 | | 4/1996 | Shen . |
| 5,516,019 | * | 5/1996 | Moon ................. 248/205.8 |
| 5,595,364 | | 1/1997 | Protz, Jr. . |
| 5,611,511 | * | 3/1997 | Lee ................... 248/205.8 |
| 5,624,091 | | 4/1997 | Protz, Jr. . |
| 5,779,205 | * | 7/1998 | Ching ................ 248/205.8 |
| 5,921,515 | | 7/1999 | Kimelman . |

FOREIGN PATENT DOCUMENTS

1569052 * 5/1969 (FR) .

* cited by examiner

Primary Examiner—Ramon O. Ramirez
Assistant Examiner—J. DeLuca

(57) ABSTRACT

A suction support assembly includes a deformable membrane connected to a fulcrum displaceable by a lever which is formed with a cam surface pivotal between engaging and disengaging position. The lever is displaceable to the engaging position of the suction support assembly, wherein it contacts only the suction cover, and has an enlarged end portion adapted to lengthen a hanging surface that receives a load.

18 Claims, 5 Drawing Sheets

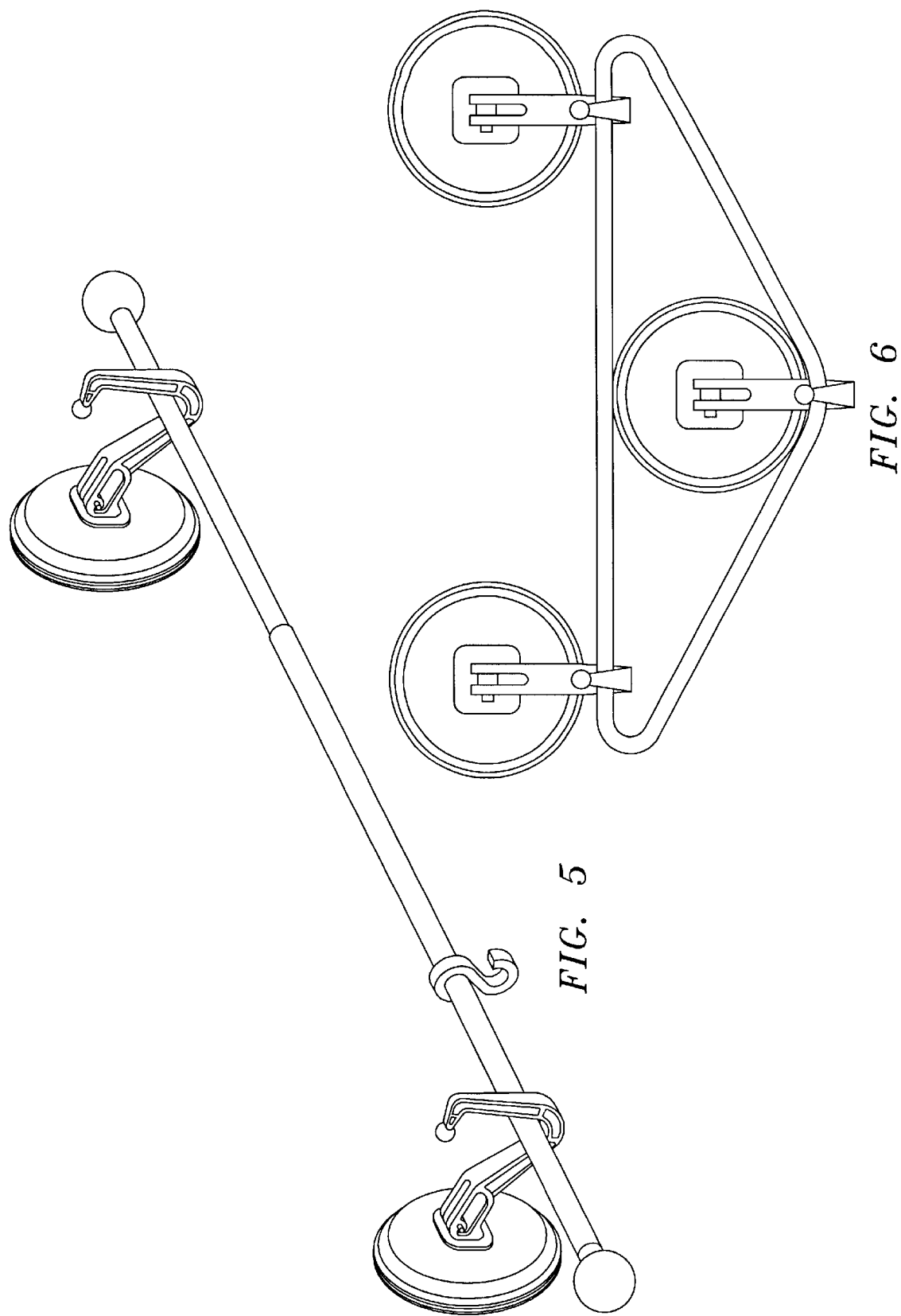

SUCTION SUPPORT ASSEMBLY

FIELD OF THE INVENTION

The present invention is related to detachable support assemblies. Particularly, this invention relates to support assemblies that are held on a relatively smooth surface by means of at least one suction cup. More particularly, it relates to a suction hook assembly that is shaped to reinforce a vacuum upon receiving articles in its engaging position. Specifically, the invention relates to a suction hook assembly that is easy to install and that can receive and support differently shaped and differently sized articles.

BACKGROUND OF THE INVENTION

The use of a suction hook assembly having at least one suction cup is known from a variety of previous patents. Specifically, it is known to have attachments that provide a fulcrum for added support. In some of these cases the fulcrum derives its support directly from the supporting surface. One of the practical consequences of the use of these structures is the undesirable marring of the supporting surface by the displaceable fulcrum. Because suction assemblies have been generally limited to application to smooth surfaces, the potential for slipping of the entire suction support is increased.

The U.S. Pat. No. 5,921,515 to Kimelman illustrates a structure having the drawbacks described above and includes a cup-shaped housing which receives a lever that deforms a diaphragm to create a vacuum. A user operates the turning member to press out air trapped between the diaphragm and a supporting surface to enable the structure to adhere to the surface. A handle of the turning member is pressed against the supporting surface. As a consequence, this surface can easily be marred and damaged. the turning member is pressed against the supporting surface. As a consequence, this surface can easily be marred and damaged.

The U.S Pat. No. 5,028,026 to Panzer is another example of a structure generally described above. Particularly, this patent discloses a suction cup support including a lever which has a cam surface pressing against a central region of the suction cup to deform a membrane, thereby creating a vacuum. Similarly to the structure disclosed in Kimelman, Panzer teaches that the lever extending beyond the suction cup may contact a supporting surface, thereby having the negative consequences, as discussed above, of marring this supporting surface.

The U.S. Pat. No. 5,595,364 to Protz discloses a hanger support including a flexible suction cup and a lever that deforms the cup during its displacement so as to create a vacuum. The lever has a pair of elongated arms extending over the cup to be positioned very close to a supporting surface so as to substantially eliminate any movement of the hanger.

While all of the above-described structures have been found to have practical applications, sometimes they may malfunction in an engaging position, wherein a hook or lever receives a load. Although preservation of a vacuum is largely a function of forces acting inwardly toward a central region of a suction cup, a load hung on an end region of the lever may negatively affect sealing of the cup and add marring to the supporting surface.

It is therefore desirable to have a suction support that does not damage a supporting surface upon receiving a load. It is also desirable to have a suction support tending to minimize the turning moment generated by a load hung on a lever of the support. It is also desirable to have a structure providing a reliable sealing contact between a peripheral region of a suction cup and a supporting surface upon loading the support. A combination of inventive suction supports characterized by ease of installation to create a variety of useful configurations adapted to receive differently shaped and sized items is also desirable.

SUMMARY OF THE INVENTION

In accordance with the invention, the objectives are achieved by a suction support structure minimizing the potential of unsealing a suction cup in a engaging position of the support by providing a lever that generates a force directed toward a peripheral region of the cup.

The lever is shaped to press against a central region of the suction cup during its displacement in the engaging position so as to simultaneously have contact with both central and peripheral regions of the cup. Such structure allows a load received by the support assembly to exert additional forces directed inwardly towards a supporting surface and reinforcing a vacuum that has been created upon displacement of the lever in the engaging position.

As a result of having the increased adhering ability of the suction support, the lever may be formed with an enlarged end hook portion receiving oversized items. The enlarged hook portion can be made in one piece. However, according to another aspect of the invention, it is contemplated to have the hook portion including at least two parts that are displaceable relative to each other so as to increase the total length of the lever. Oversized items placed on the increased hook portion generate a force having a vector directed at the central and peripheral regions of the lever, thereby reinforcing a vacuum. As a result, the suction support capable of carrying relatively heavy loads in its engaging position can have a variety of useful applications. For example, a group of three suction supports mounted on a flat supporting surface can be arranged in a triangular configuration. This combination of the supports having their hook portions extended and connected to one another can be both esthetically appealing and functionally useful by offering additional hanging surfaces. Even a single suction support provided with an extended hook portion can have a variety of applications ranging from a simple home use to an industrial use, for example, in construction.

It is therefore an object of this invention is to provide a suction support assembly overcoming the drawbacks that are characteristic of the known prior art, as enumerated in the background portion of this application.

Another object of the invention is to provide a suction support assembly that may realize optimum holding power and engagement life of a suction cup.

Still another object of the invention is to provide a suction support assembly that can have a simple structure allowing the support to be effectively adhered to a supporting surface.

Yet another object of the invention is to provide a suction support assembly that has a lever rotatable to a suction position of the support and shaped to provide a two-point contact with a suction cup to provide an enhanced adhering of the support assembly to a supporting surface.

Still another object of the invention is to provide a suction support having a lever assembly that is able to receive a variety of articles generating forces directed to reinforce a vacuum between a suction cup and a supporting surface in a engaging position of the support assembly.

Yet a further object of the invention is to provide a system including a combination of a plurality of suction supports that are capable of receiving a utility members, such as a shelve or the like.

BRIEF DESCRIPTION OF THE DRAWINGS

The above and other objects, features and advantages will become more readily apparent from the following description accompanied by the drawings, in which:

FIG. 5 is an exploded view of a suction support assembly of FIG. 1.

FIG. 6 is one of practical applications of a combination including a few support assemblies similar to the one shown in FIG. 1.

DETAILED DESCRIPTION OF THE DRAWINGS

This invention can best be understood by reference to the accompanying drawings that are presented in FIGS. 1 through 7. In accordance with the invention, a suction support assembly is comprised of a lever shaped to deform a membrane to create a vacuum in an engaging position of the lever, in which the lever has a multi-point contact with a cover.

Figure 1:
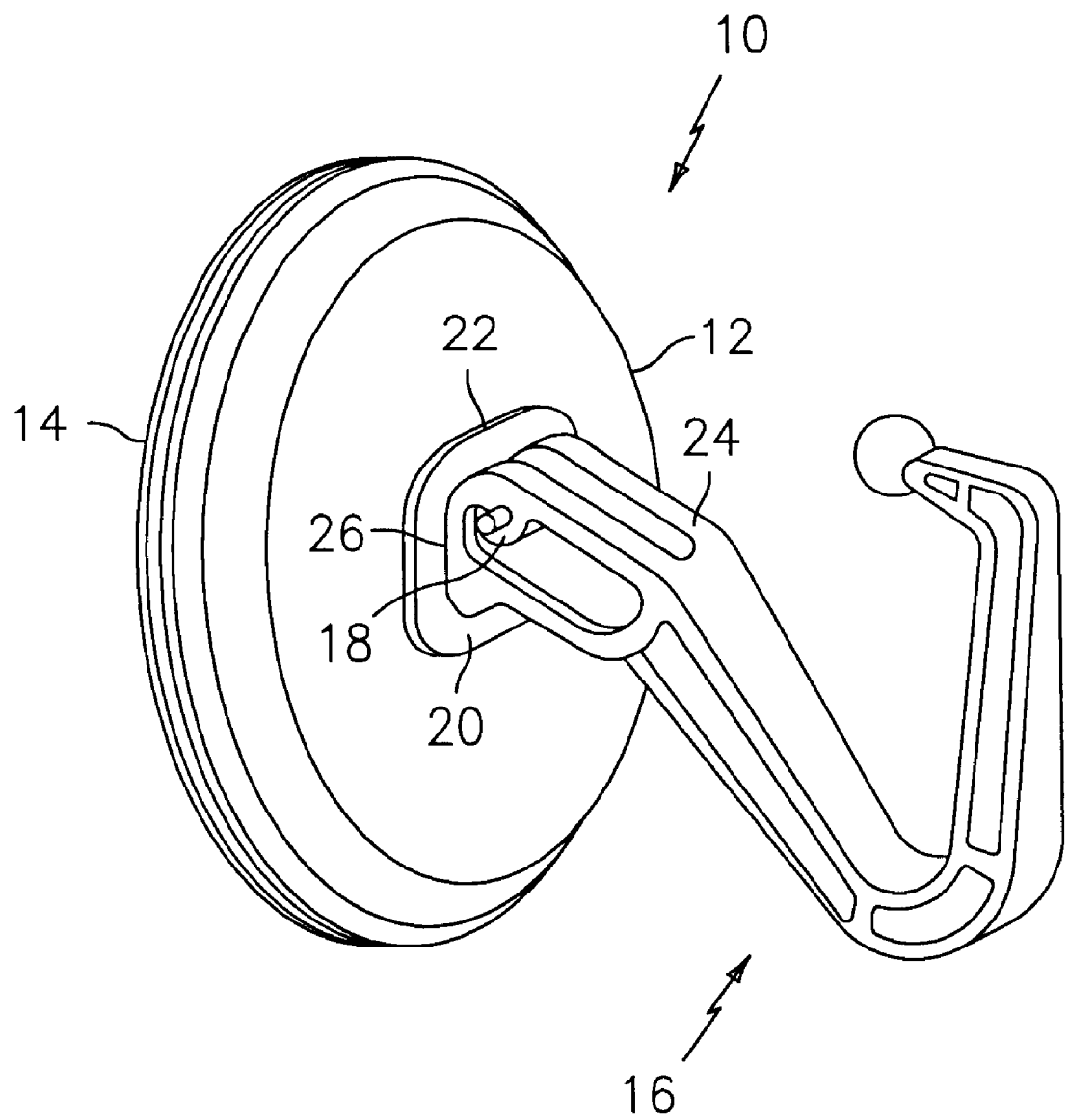
FIG. 1 is an isometric view of a suction support assembly of the invention.
Figure 2:
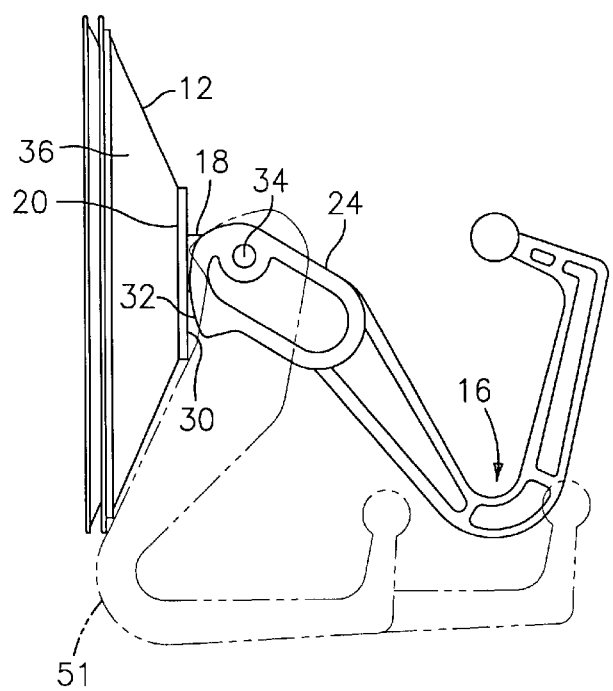
FIG. 2 is a side view of a suction support assembly shown in FIG. 1.
Figure 3:
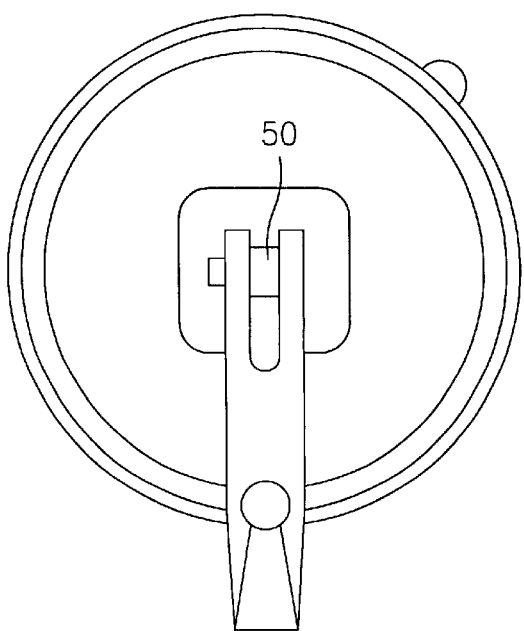
FIG. 3 is a back view of a suction support assembly shown in FIG. 1
Figure 4:
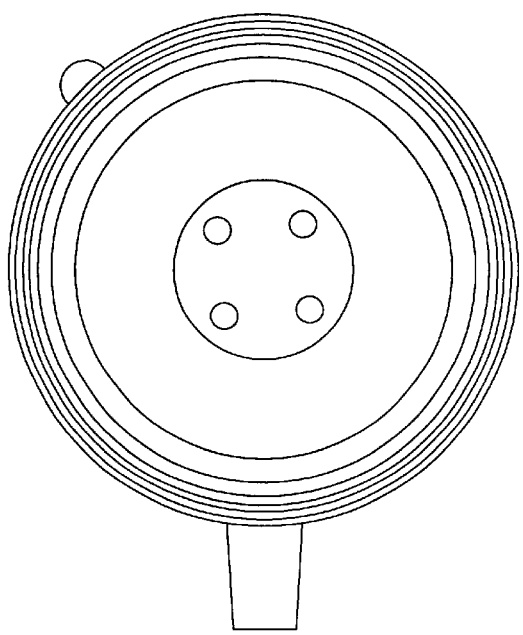
FIG. 4 is a front view of a suction support assembly shown in FIG. 1.

Particularly, referring to FIGS. 1 and 2, a suction support assembly 10 is illustrated and has a suction cover 12, which is connected to a membrane or diaphragm 14, and a lever 16 pivotally mounted on the cover 12 to pivot from a disengaging position to an engaging position. The cover 12, shaped as a concave disk, carries a main support function and serves as a base for the lever 16. In order to facilitate angular displacement of the lever, the cover 12 may be formed with a hub 20 located in a raised central region 22 of the cover. The cover and the membrane are operatively connected to one another by means of a fulcrum 18 that provides displacement of the membrane relative to the cover so as to create a vacuum, as will be explained hereinbelow. The cover may be molded from any deformable material contemplated by an ordinary skilled worker to be useful for purposes of the present invention. For instance, rubber or rubberlike material has been found particularly suitable for manufacturing this cover.

According to one aspect of the invention, the lever 16 has a base 24 formed with a cam 26 that faces and presses against the central region 22 in a engaging position of the support assembly. Referring to FIG. 2, the cam has a relatively flat surface 30 terminating in a slanted rounded surface 32. The cam is so shaped that it is in contact with the central region 22 in the engaging position of the lever, as shown in FIG. 2.

Particularly, when the lever is in its disengaging position, wherein no vacuum is created, the cover may easily slide along the fulcrum 18 between the flat surface 30 of the lever and the membrane. The lever is sized to have its rounded surface 32 pivot around a pivot axis 34 and, upon application of an external force, is displaced to the engaging position, wherein the cam surface presses against the central region of the cover. As illustrated by phantom lines in FIG. 2, further displacement of the cover relative to the membrane is arrested in this engaging position and a load can be placed on the hook portion.

Figure 7:
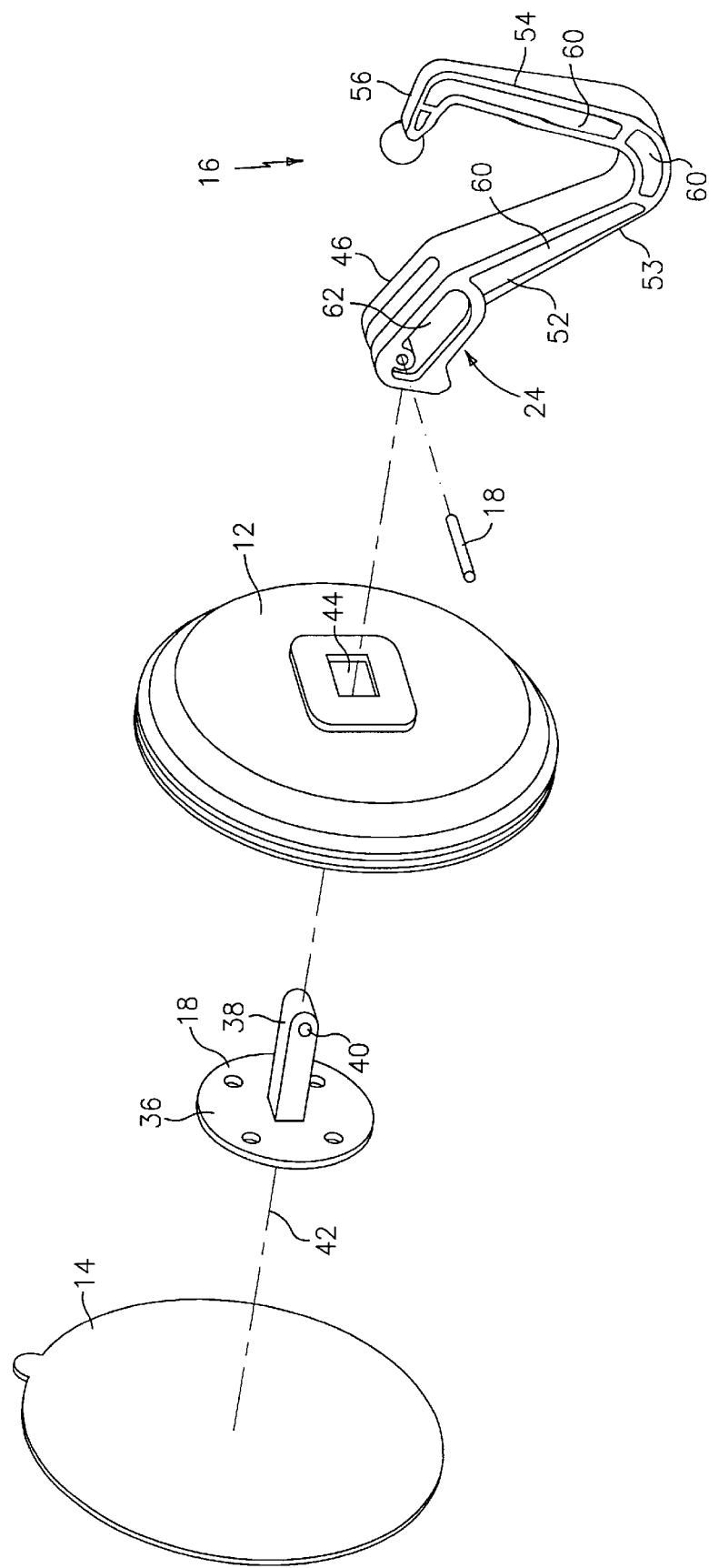
FIG. 7 is another practical application of a support assembly in accordance with the invention.

Turning to FIG. 7, the membrane 14 is juxtaposed with a supporting surface (not shown here) and has, for example, an annular shape. To provide displacement of the membrane creating a vacuum, the membrane may be attached to the fulcrum 18 by any adhering means, as indicated by the four circular points of adhesion in FIG. 4. The only requirement this combination has to meet is that the fulcrum and membrane simultaneously move in a direction perpendicular to a supporting surface. Alternatively, the membrane and the fulcrum can be molded as a single piece. Preferably, the fulcrum has a disk-shaped base 36 that is affixed to a central region of the flexible membrane 14 and a post 38. Both the base and the post of the fulcrum may assume different shapes and the embodiments illustrated here are provided solely as examples and are not intended to be limitations on the various embodiments of the invention.

The post 38 has a distal end formed with a thoroughgoing hole 40, which extends generally perpendicular to an axis 42. The central region 22 of the cover 12 has an opening 44 centered along the axis 42 and receiving the post, which extends through this opening so that its distant end terminates between two arms 46 of the lever 16. Completing the assembly 10 is a pin 48 that traverses the hole 40 and openings 44 that are aligned with the hole 40 upon insertion of the post between the arms. The pin may have a threaded end receiving a nut that secures the pin to the arm. To reinforce such connection, a sleeve 50 that is located between the arms, as can be better seen in FIG. 3, surrounds the pin. As a result, the membrane 14, the fulcrum 18 and the cover 12 are coaxially connected together and are displaceably fixed in a lateral direction with respect to one another.

It is understood that the lever 16 may have various shapes and ornamental forms. However, the embodiment shown in the drawings primarily relates to a hook assembly so the lever has proximal and distal portions 52, 54 extending angularly toward one another and forming a hook. Preferably, an angle between the proximal and distal portions does not exceed 90°. A bent end 56 of the distal portion provides a stop for a load hung on the hook assembly.

Returning to FIG. 2, according to another aspect of the invention, as the lever is displaceable toward the engaging position, the fulcrum 18 moves axially outward thereby deforming the membrane 14. It is worth noting that there is no visible deformation of the central region 22 of the cover. Displacement of the flexible membrane forces its outer peripheral region to spread out along the supporting surface, while the membrane substantially deforms to conform to an inner surface of the cover extending between its central and peripheral regions. As a result of such deformation, air accumulated between the diaphragm and the supporting surface is forced out and a vacuum is created. The diaphragm is securely sandwiched between the supporting surface and the peripheral region 36 of the cover in the engaging position of the support assembly. Thus, outward displacement of the fulcrum deforming the membrane causes the peripheral region of the membrane to spread out along the supporting surface thereby creating a vacuum.

In accordance with another aspect of the invention shown in phantom lines of FIG. 2, the proximal portion 52 of the lever, extending along the cover 12 in the engaging position of the support, contacts only the peripheral region 36 of the cover substantially below the hub 20. The lever is so shaped that a bent form 51 does not touch the supporting surface, thereby preventing it from damage. Another important consequence of such structure is that the hook's displacement along the smooth supporting surface upon loading its distal portion 54 is arrested. Still another important consequence of the lever's shape is that the increased distal portion 54 can receive heavy and oversized items without compromising the structural integrity of the whole assembly. Moreover, the heavy loads generate additional forces which acting toward the central and peripheral regions of the cover reinforce the vacuum. Further, the heavy loads do not negatively affect the supporting surface since the lever contacts only the cover in its engaging position.

Preferably, the proximal portion 52 is shaped so its inner surface 53 (FIG. 7) extends substantially parallel to an outer surface of the cover 12 that is defined between the hub 20 and the peripheral region 36 in the engaging position. Thus, when, upon applying the load to the distal portion 54, the inner surface 53 extends substantially parallel to the cover and contacts its central and peripheral regions, a uniform pressure is generated on the hub 20. This pressure, in turn, results in a force directed substantially perpendicular to the supporting surface and provides the optimum performance of the entire support assembly.

According to another aspect of the invention, the proximal portion 52 of the lever may be shaped to have a continuous contact with the outer surface of the cover, which can further to reinforce the support assembly in the engaging position. The proximal and distal portions of the lever may be connected by an intermediary piece that extends generally parallel to the supporting surface in the engaging position of the assembly and may contact this surface thereby increasing the overall contact area between the assembly and the support surface. As mentioned above, the increased overall size of the lever allows a user to utilize the inventive support assembly for supporting heavy loads.

Still another aspect of the invention allowing the lever to increase its overall size is that the lever can be extended upon applying an external force. Implementation of such a feature may be achieved by various structures. Preferably, the distal portion 54 includes a telescopically displaceable region including the bent end 56 that can assume a position shown in phantom lines of FIG. 2. This feature provides an additional range of the support's applications. For instance, the support ordinarily receiving small items can be extended by a user if he or she needed an additional hanging surface, as is often the case in a small bathroom, wherein a number of hooks supporting towels, bathing robes and etc., can only add inconvenience.

Each of the arms of the base 24 of lever 16 may have a recessed side 62 (FIG. 7), which in combination with recessed regions of the proximal and distal portions 52, 53 create an appealing design.

It is easy to envision a variety of designs and applications of the support assembly according to the invention. As has been mentioned before, based on structural specifics of the present invention and particularly, the increased distal portion of the lever, one can combine a few supports together to even further diversify the support's application. Thus, for instance, shaping the levers so that their distal portions extend parallel to a supporting surface, one can form a shelf by simply directing these distal portions towards one another. Further, a unitary arrangement including two spaced apart suction covers which are bridged by an array of levers, each shaped to reinforce a vacuum, as disclosed by the invention, offers functional alternatives to the typical use of a suction support.

FIGS. 5, 6 and 7 illustrate just a few applications of the inventive support assembly. Thus, in addition to the applications discussed above, it is possible to utilize a pair of the support assemblies bridged by a crossbar having a polygonal cross-section, such as a plate in FIGS. 8–9, or an annular cross section, as is illustrated in FIG. 5. The crossbar may have a telescopic structure that allows a user to easily change a distance between the support assemblies if there is any need to it. Another application, as shown in FIG. 6, includes a triangular configuration of the suction support assemblies. This particular combination of the supports offers a variety of supporting rods extending between neighboring assemblies.

Figure 8:
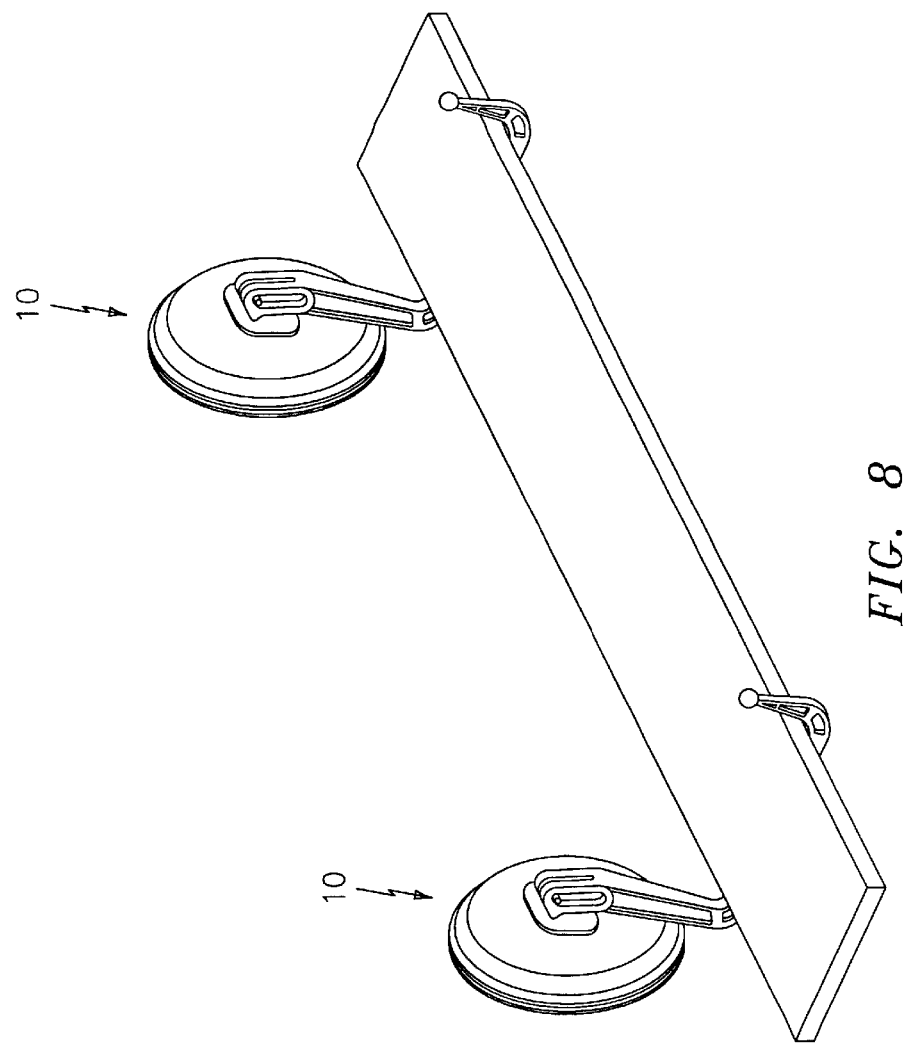
FIG. 8 is a supporting system in accordance with the invention.
Figure 9:
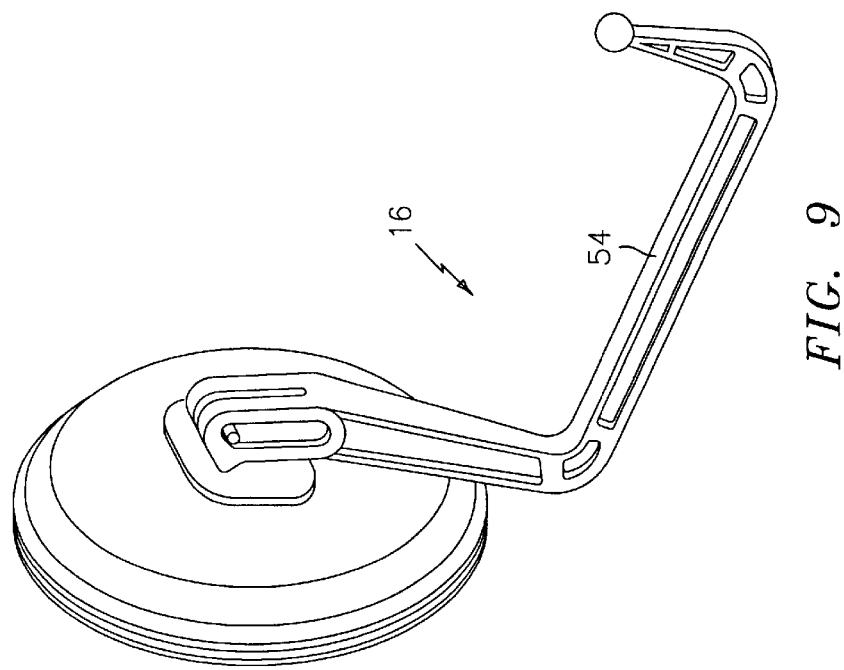
FIG. 9 is an isometric view of a suction support assembly manufactured with an oversized hook.

Still another combination, according to the invention, is illustrated in FIG. 8 and includes a pair of support hooks assemblies 10 that may be mounted at a distance from one another to receive a shelve therebetween. Each hook assembly 10 has an enlarged distal portion 54 of the lever 16, as shown in FIG. 9. To increase the distal portion 54, the latter may include a few telescopically connected parts, as shown diagrammatically by dash lines in FIG. 2. Having this system one can easily utilize it as a supporting assembly that may be used in a kitchen or bathroom for storing a variety of items. Arranging a different number of the inventive suction hooks with various supporting elements in commercially available kits can provide an effective means for supporting and storing differently sized and shaped items within a limited space of modern urban dwellings.

It is understood that the support assembly of this invention can be useful in different configurations and orientations as well. Further, although only a few embodiments of the present invention have been described in detail hereinabove, all modifications to this invention are covered by the following claims.

What is claimed is:

1. A suction support adhering to a surface, comprising:
   a membrane extending;
   a cover coaxial with the membrane and having an outer peripheral juxtaposed with the membrane and a central region, said regions being spaced from one another;
   a fulcrum attached to the membrane and extending outwardly through the central region of the cover; and
   a lever pivotally mounted on the fulcrum to pivot to an engaging position, the fulcrum being outwardly-displaced to deform the membrane so as to create a vacuum between the surface and the membrane as the lever is displaced to the engaging position, wherein the lever simultaneously presses against the peripheral and central regions of the cover to reinforce the vacuum, the lever being shaped to extend parallel to and to be in continuous contact with a substantial portion of the cover extending from the peripheral region toward the central region in the engaging position of the lever.

2. The suction support defined in claim 1, wherein the hook assembly is formed with a proximal portion extending angularly inwardly toward the outer peripheral region of the cover from the cam surface in the engaging position and a distal portion extending transversely to the proximal portion.

3. The suction support defined in claim 2, wherein the proximal portion of hook assembly has two spaced apart arms, each formed with an eyelet, the central region of the cover having an opening receiving the fulcrum which is formed with a recess aligned with the eyelets of the arms upon insertion of the fulcrum through the opening of the central region.

4. The suction support defined in claim 3, wherein the aligned recess and the eyelets are traversed by a fastener serving as a pivot axis for the lever.

5. The suction support defined in claim 3, wherein the fulcrum and the membrane are molded as a unitary piece.

6. The suction support defined in claim 2, wherein the proximal and distal portions extend at a 90° angle with respect to one another.

7. The suction support defined in claim 2, wherein the distal portion of the hook assembly is shaped to receive a load so that the cam surface and the proximal portion urge against the cover with a force directed to reinforce the vacuum in the engaging position.

8. The suction support defined in claim 2, wherein the distal portion has an end region extending perpendicular to a body of the distal portion and toward the cam surface of the lever in the engaging position thereof.

9. The suction support defined in claim 8, wherein the end region is extendable to lengthen the distal portion of the hooking assembly.

10. The suction support defined in claim 2, wherein the proximal and distal portions of the hook assembly has opposite sides, each of the sides having a plurality of recessed regions.

11. The suction support defined in claim 1, wherein the lever is a unitarily molded piece.

12. The suction support defined in claim 2, wherein the fulcrum and the membrane are removably attached to one another.

13. A suction support adhering to a surface, comprising:
   a membrane;
   a cover having an outer peripheral region juxtaposed with the membrane and a central region, wherein said regions being spaced apart;
   a fulcrum attached to the membrane and extending outwardly through the central region of the cover; and
   a hook-shaped lever pivotally mounted on the fulcrum to pivot to an engaging position, the lever being shaped to extend parallel to and to be in continuous contact with a substantial portion of the cover extending from the peripheral region toward the central region in the engaging portion of the lever, the fulcrum being outwardly displaced to deform the membrane so as to create a vacuum between the surface and the membrane as the lever is displaced to the engaging position, wherein the lever simultaneously presses against the peripheral and central regions of the cover to reinforce the vacuum, the cover and the membrane having substantially the same outer dimensions.

14. The suction support defined in claim 13, wherein the membrane is disk-shaped, the cover having substantially a circular cross-section.

15. A suction support for receiving a clothing load and adapted to adhere to a surface, the suction support comprising:
   a membrane;
   a fulcrum attached to the membrane and extending therefrom;
   a cover receiving the fulcrum and formed with central and peripheral regions;
   a hook pivotally connected to the fulcrum and having a compressure edge which is positioned to move the fulcrum outwardly when the hook is pivoted to an engaging position, the compressure edge urging against the central region of the cover to deform the membrane so as to create a sufficient vacuum, the hook being shaped to have an inner surface parallel to and in substantially continuous contact with the cover from the peripheral to the central region, so that the hook reinforces the vacuum upon receiving the clothing load in the engaging position.

16. A system for storing and supporting a variety of items, the system comprising:
   at least two spaced apart suction supports removably mounted on a supporting surface in a desirable configuration, each suction support including a cover, a membrane, and an engaging surface pivotally mounted on the cover and connected to the membrane to pivot to an engaging position, wherein the membrane is deformed to create a sufficient vacuum, the engaging surface being shaped to have a proximal end extending parallel to the cover and being in substantially continuous contact therewith extending from the peripheral region toward the central region in the engaging position, and a distal end longer than the proximal end; and
   a supporting element extending between and being removably attached to the distal ends of the engaging surfaces to receive and store the variety of items.

17. The system defined in claim 16, further comprising another suction support aligned with and spaced from two suction supports to receive the supporting element.

18. The system defined in claim 16, further comprising another suction support mounted on the supporting surface and forming a triangular configuration with the two supports.

* * * * *